United States Patent
Sakai et al.

(10) Patent No.: US 6,199,680 B1
(45) Date of Patent: Mar. 13, 2001

(54) METHOD AND APPARATUS FOR BUNCHING PTPS AND FOR TRANSFERRING THE BUNCHED-PTPS

(75) Inventors: Shinsuke Sakai, Chiba; Toshio Omori, Tokyo, both of (JP)

(73) Assignee: Omori Machinery Co., Ltd., Saitama (JP)

( * ) Notice: Subject to any disclaimer, the term of this patent is extended or adjusted under 35 U.S.C. 154(b) by 0 days.

(21) Appl. No.: 09/318,989

(22) Filed: May 26, 1999

(30) Foreign Application Priority Data

Sep. 25, 1998 (JP) .................................................. 10-271832

(51) Int. Cl.[7] .................................................. B65G 47/26
(52) U.S. Cl. ..................................... 198/419.2; 198/419.3; 198/468.3; 53/446; 53/542; 53/544
(58) Field of Search .............................. 198/419.2, 419.3, 198/468.3; 53/446, 542, 544, 539

(56) References Cited

U.S. PATENT DOCUMENTS

| | | | | |
|---|---|---|---|---|
| 3,448,865 | * | 6/1969 | Schroder | 198/468.3 |
| 3,662,875 | * | 5/1972 | Salomon | 198/419.3 |
| 3,747,737 | * | 7/1973 | Brooke | 198/374 |
| 4,444,424 | * | 4/1984 | Lebret | 198/468.3 |
| 5,630,311 | * | 5/1997 | Flix | 198/419.3 |
| 5,897,292 | * | 4/1999 | Gerwe et al. | 198/374 |

FOREIGN PATENT DOCUMENTS 7-2358   6/1995  (JP) .
7-2359   6/1995  (JP) .

* cited by examiner

Primary Examiner—Joseph E. Valenza
(74) Attorney, Agent, or Firm—Dougherty & Clements LLP

(57) ABSTRACT

A method and apparatus adapted to bunch together a predetermined number of inverted PTPs and uninverted PTPs into a bundle, and then transfer each PTP bundle to a bucket conveyor which moves intermittently in parallel with a conveying passage. A multitude of PTPs, a portion of which are inverted with respect to the conveying direction and the rest of which are not inverted, are conveyed along a first conveying passage while maintaining the blistered surfaces of the inverted and uninverted PTPs in parallel with each other. A selected portion of the PTPs being conveyed in the first conveying passage is pinched and separated from the same passage. The separated PTPs are bunched together while the spacing between the separated PTPs is narrowed in the conveying direction. The bunched PTPs are transferred onto a second conveying passage across the first conveying passage. The bunched PTPs are loaded into a bucket provided on a bucket conveyor which intermittently travels along the second conveying passage.

8 Claims, 9 Drawing Sheets

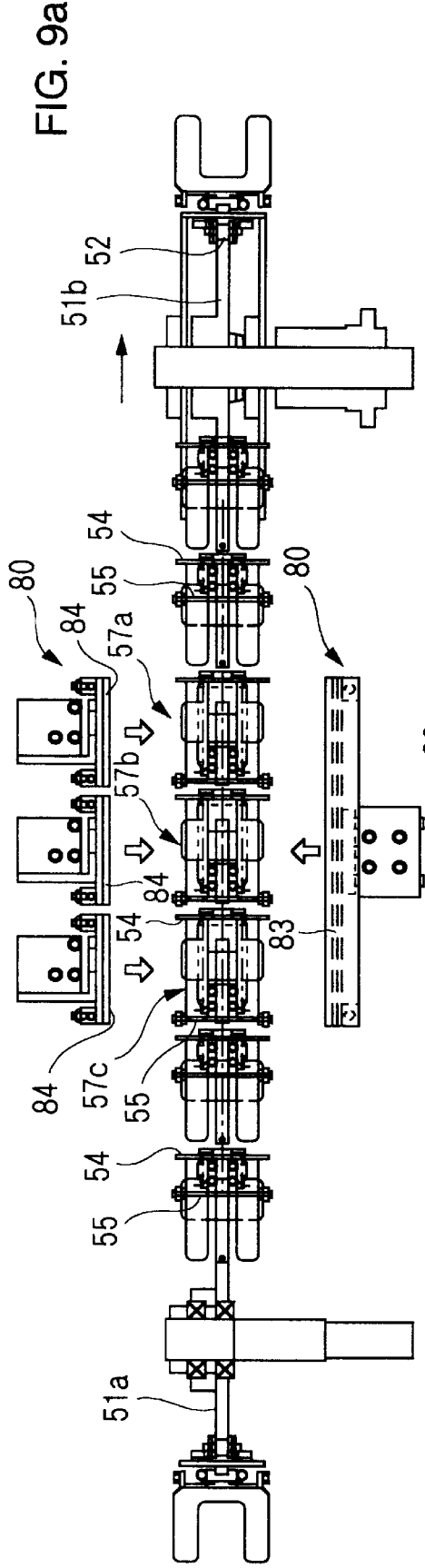
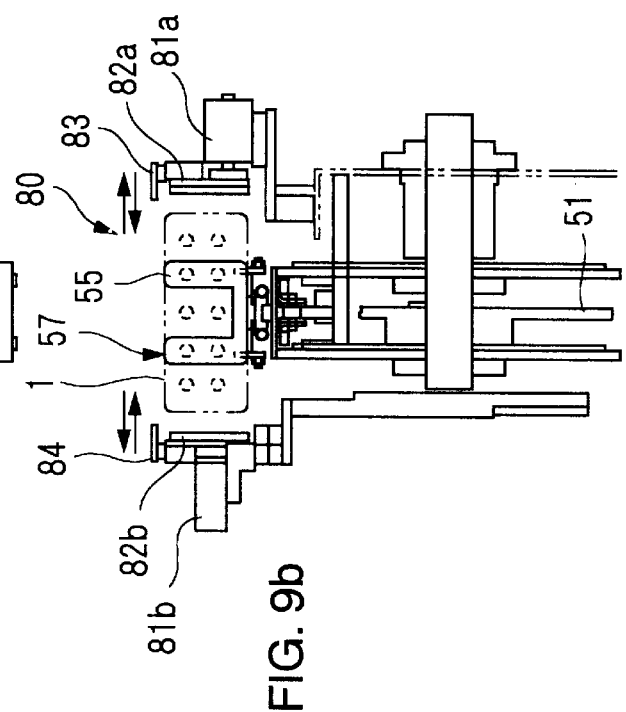

METHOD AND APPARATUS FOR BUNCHING PTPS AND FOR TRANSFERRING THE BUNCHED-PTPS

BACKGROUND OF THE INVENTION

1. Field of the Invention

The present invention relates to a method and apparatus adapted to bunch together a predetermined number of inverted and uninverted PTPs ("press-through packs", as for tablets or the like) being conveyed on a conveying means into a bundle, and to transfer the PTP-bundle to a bucket conveyor which moves intermittently in parallel with a conveying passage, in order to facilitate the binding operation of the bundled-PTPs.

2. Description of the Related Art

Referring to FIG. 1, a generally known PTP 1 has a plastic sheet 2 provided with a plurality of blisters 2a in one surface thereof (hereinafter, referred to as "blistered surface"), tablets 3 or such are put in the blisters 2a, and the blisters 2a containing the tablets 3 are sealed hermetically by a sheet 4, such as an aluminum foil.

A plurality of such PTPs are usually superposed into stacks and bundled with a band or packed into a box or other containers. In order to reduce the thickness of the stacks, one out of two PTPs being conveyed is inverted so that the blistered surface 2 of one PTP faces the blistered surface of the other. Then, the PTPs are slightly shifted so as to prevent abutment of the blisters 2a, as shown in FIG. 2.

The present applicant has previously proposed a method and apparatus for conveying PTPs in U.S. patent application Ser. No. 09/237,144, in order to form the aforesaid PTP stacks automatically. In this application, firstly, a plurality of PTPs aligned parallel with each other are conveyed along a conveying passage with their blistered surfaces facing the same direction. Then, a selected portion of the PTPs being conveyed on the conveying passage are pinched and separated from the remaining PTPS, and the separated PTPs are inverted so that their blistered surfaces oppose the blistered surfaces of the remaining PTPs. Finally, the thus-inverted PTPs are returned onto the same conveying passage and are conveyed together with the uninverted PTPs.

A predetermined number of the inverted and uninverted PTPs have to be subsequently bundled and bound together with a band or other appropriate binding means. However, the aforesaid conveying passage is driven continuously and the PTPs are relatively spaced away from each other, so it is difficult to bundle and take out a predetermined number of PTPs under continuous conveyance.

SUMMARY OF THE INVENTION

The present invention has been accomplished in view of the above-mentioned problem, and it is an object of the invention to provide a method and apparatus adapted to bundle a predetermined number of inverted and uninverted PTPs, and to transfer the bundled PTPs to a bucket conveyor, which moves intermittently and in parallel with the aforesaid conveying passage, in order to facilitate the subsequent binding operation.

In order to achieve the above-mentioned and other objects, according to one aspect of the present invention, a method of bunching and transferring press-through packs (PTPs) comprises the steps of conveying a multitude of PTPs, a portion of which are inverted and the rest of which are not inverted, along a first conveying passage while maintaining blistered surfaces of the inverted and uninverted PTPs in parallel with each other, pinching a selected portion of PTPs being conveyed in the first conveying passage and separating them from the passage, bunching the separated PTPs together while narrowing the spacing between the separated PTPs in the conveying direction, transferring the bunched PTPs onto a second conveying passage across the first conveying passage, and loading the bunched PTPs into a bucket provided on a bucket conveyor which travels along the second conveying passage.

Since the PTPs separated from the first conveying passage are first bunched together in the conveying direction before being transferred to the second conveying passage, it is possible to shorten the overall length of the apparatus. Further, since a predetermined number of bunched PTPs are transferred onto the bucket conveyor, the bunched PTPs can be taken out easily from the bucket conveyor as a bundle, and can be easily subjected to the subsequent binding operation, such as binding with a tape.

Preferably, a conveying means associated with the first conveying passage is driven continuously, while the bucket conveyor associated with the second conveying passage is driven intermittently.

Thereby, the buckets of the bucket conveyor are allowed to wait at a predetermined position by its intermittent movement while the predetermined number of PTPs are being continuously pinched, separated from the first conveying passage, and bunched together. Therefore, the bunching and transferring operations can be done efficiently without waste of time. Further, by the intermittent movement of the bucket conveyor, PTPs can be taken out as a bundle which facilitates the subsequent binding operation.

Preferably, the inverted and uninverted PTPs of the multitude of PTPs are arranged in an alternate manner, and plural pairs of PTPs are pinched and separated from the first conveying passage, each pair of PTPs consisting of an inverted PTP and an uninverted PTP.

According to the above construction, each pair of PTPs can be firmly pinched and separated without being mutually displaced, so that the bunching and transferring operations can be done easily and positively.

Preferably, the separated PTPs are bunched into a plurality of groups in their conveying direction and the thus-bunched PTP groups are respectively loaded into separate buckets. In this case, a large number of PTPs can be efficiently bunched and transferred.

According to a further aspect of the present invention, an apparatus for bunching and transferring PTPs comprises a first conveying means for conveying a multitude of PTPs, a portion of which are inverted and the rest of which are not inverted, along a first conveying passage while maintaining the blistered surfaces of the inverted and uninverted PTPs in parallel with each other, a pinching means having a multitude of pinching units, a first drive means for reciprocating the pinching means in the longitudinal direction of the first conveying passage, a second drive means for reciprocating the pinching means in the vertical direction of the first conveying passage, a third drive means for reciprocating the pinching means in a direction transverse to the first conveying passage, an opening/closing means for opening and closing pinching fingers of the pinching units at predetermined timings, an expanding/contracting means which expands and contracts the spacings between the pinching units of the pinching means in the longitudinal direction, and a second conveying means constituted by a bucket conveyor adapted to travel along a second conveying passage which is parallel to the first conveying passage. The first, second and third drive means, the opening/closing means and the expanding/contracting means are controlled so as to carry out the method according to the preceding aspect of the present invention, as described above.

Such an apparatus according to the invention permits the foregoing method to be carried out with extreme ease and sureness.

Preferably, in the above apparatus, the multitude of pinching units may be attached to an expanding/contracting arm capable of expanding and contracting in a pantograph form. When the expanding/contracting arm is in an expanded state, the pinching units are in a position above the first conveying passage so that each the pinching unit can pinch a pair of PTPs adjacent to each other longitudinally in the first conveying passage. When the expanding/contracting arm is contracted, the spacing between the pinching units is narrowed to at least one half the length of the spacing in the expanded state.

Thus, the spacing between the pinched-PTPs can be narrowed to a great extent, and hence, it is possible to shorten the overall length of the apparatus. Further, the subsequent loading of bunched-PTPs into the buckets of the bucket conveyor can be done steadily.

Preferably, the bucket conveyor may be driven intermittently, and the buckets of the bucket conveyor are each composed of a fixed bucket piece and a movable bucket piece capable of moving close to and away from the fixed bucket piece through a tension spring, the movable bucket piece being provided with a lug. Preferably, the second conveying passage is provided with protruding pieces, and each protruding piece is adapted to protrude into the second conveying passage at predetermined timings and come into engagement with the lug of the movable bucket piece to move the movable bucket piece away from the fixed bucket piece upon conveying of each bucket.

Resultantly, it is possible to widen the loading space of the bucket in advance, which facilitates the loading of PTPs. Also, it is possible to narrow the space after loading, which ensures the bunched state of the PTPs.

Preferably, means capable of preventing dislodgment of the bunched-PTPs are disposed on both sides of the second conveying passage, the dislodgment-preventing means covering both side portions of the upper end of the bunched PTPs when loaded into each bucket. With such dislodgment-preventing means, the PTPs which have been inserted into a bucket can be prevented from rising together with the pinching unit and falling out from the bucket. Thus, the insertion and separation operation of the pinching units can be done more rapidly.

As many different embodiments of this invention may be made without departing from the spirit and scope thereof, it is to be understood that the invention is not limited to the specific embodiments described hereinafter.

BRIEF DESCRIPTION OF THE DRAWINGS

FIG. 5 is a view showing a device for expanding and contracting the pinching units of the present invention, in which

FIG. 8 shows a device for moving a movable-bucket piece away from a fixed-bucket piece in each bucket to expand the space of the same, in which

FIG. 9 shows a PTP dislodgment-preventing device of the present invention, in which FIG. 9a is a plan view thereof and FIG. 9b is a sectional side view thereof.

DETAILED DESCRIPTION OF PREFERRED EMBODIMENTS

A preferred embodiment of the present invention will be described hereinafter with reference to the accompanying FIGS. 3 through 10.

Figure 1A:
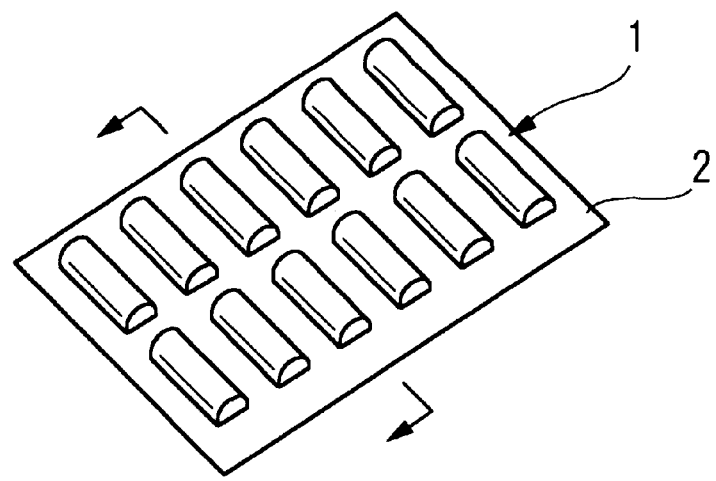
FIG. 1a is a perspective view showing an example of a PTP.
Figure 1B:
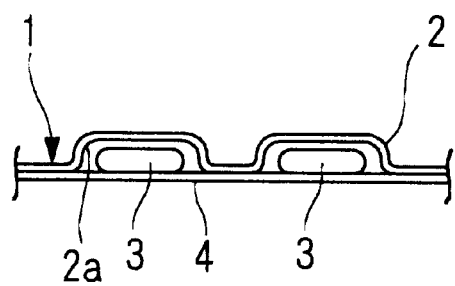
FIG. 1b is a sectional view thereof.
Figure 2:
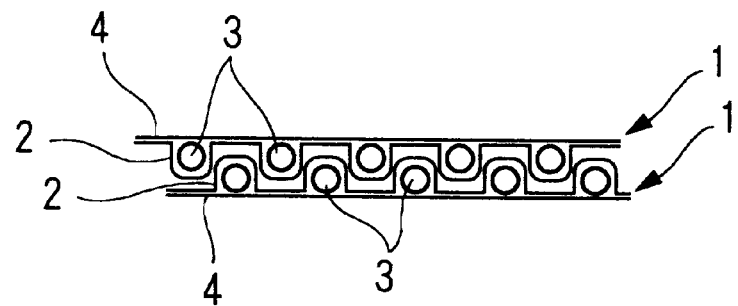
FIG. 2 is a sectional view showing a combined state of two PTPs with respective blistered surfaces facing each other.
Figure 3:
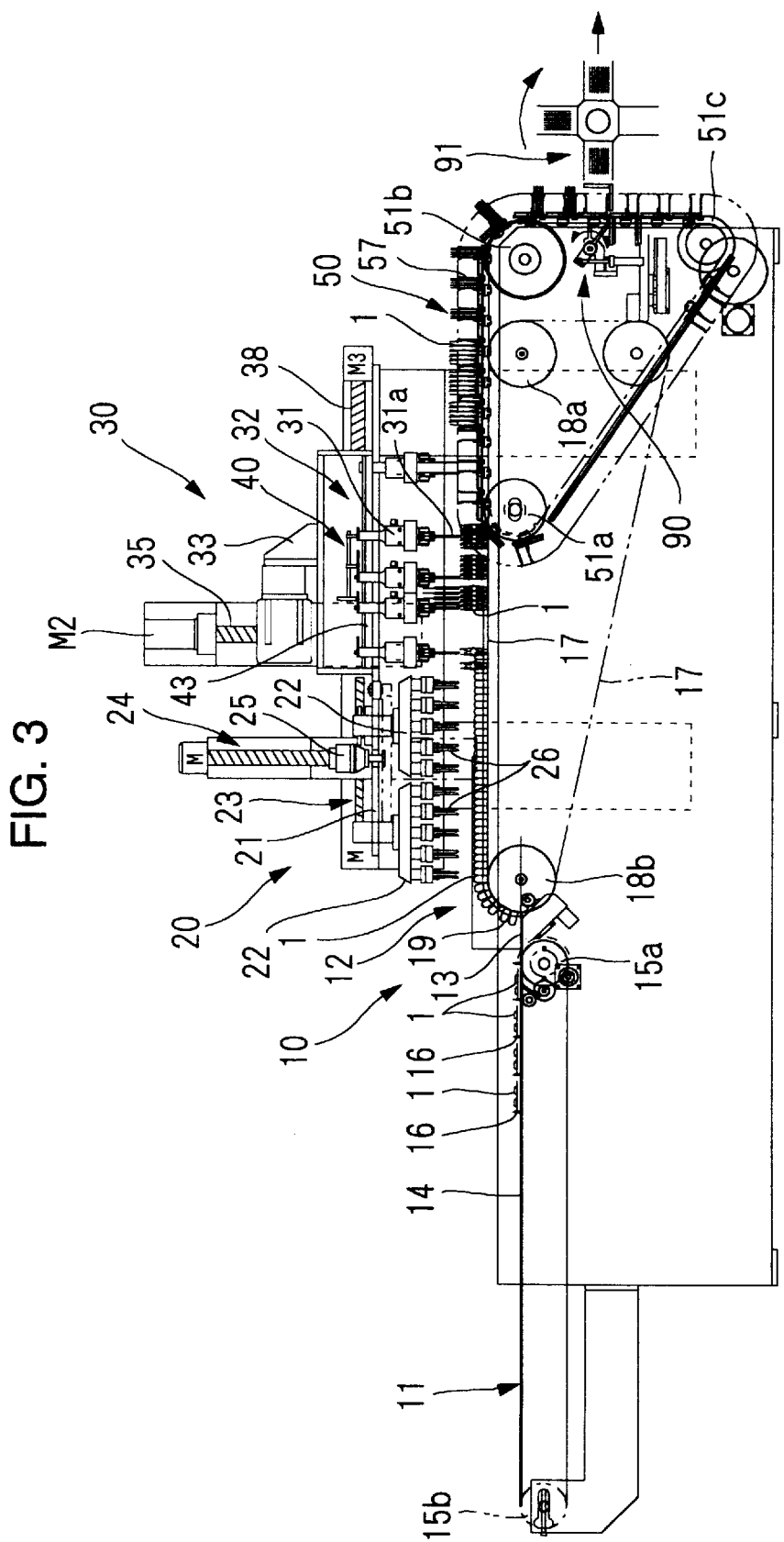
FIG. 3 is a partially sectional front view showing the whole PTP bunching and transferring apparatus embodying the present invention.

FIG. 3 illustrates a PTP conveying apparatus 10, a PTP inverting apparatus 20 and a PTP bunching and transferring apparatus 30 embodying the present invention. The conveying apparatus 10 is provided with a horizontally conveying means 11 for conveying PTPs 1 in a horizontal state with their blistered surfaces facing upward, and an uprightly conveying means 12 disposed downstream of the horizontal conveying means 11 to convey PTPs in an upright state. A vacuum conveyor 13 is disposed between both conveying means 11 and 12 to transfer PTPs from one coveying means to the other.

The horizontally conveying means 11 comprises timing-belt pulleys 15a and 15b disposed in pairs at the front and rear ends of a conveying passage, and an endless belt 14 wound around the pulleys 15a, 15b. The endless belts 14 are provided with projections 16 at predetermined intervals to push PTPs 1 forward in a horizontally laid state.

The uprightly conveying means 12 comprises timing-belt pulleys 18a and 18b disposed in pairs at the front and rear ends of a conveying passage, and a pair of endless belts 17 extended on both sides of the conveying passage and wound on the pulleys 18a, 18b. Each endless belt 17 is provided with a multitude of pinching pieces 19 having free ends with chamfered corners. The pinching pieces 19 are all aligned in the longitudinal direction of the endless belts 17, and are slightly spaced from one another, more specifically, spaced a distance corresponding to the thickness of the edge of each PTP. The longitudinal positions of the pinching pieces 19 arranged on one of the endless belts 17 correspond with those of the pinching pieces 19 arranged on the other, respectively. The space between the pair of pinching pieces 19 opposed to each other on both sides of the conveying passage (i.e., the uprightly conveying passage) is narrower than the width of each PTP, and is adjustable. Each PTP can be pinched between two, longitudinally adjacent pairs of pinching pieces 19.

Firstly, PTPs 1 are pushed forward successively by the projections 16 formed on the endless belts 14 of the horizontally conveying means 11. When they arrive at the front end of the horizontally conveying means 11 and come above the vacuum conveyor 13, the PTP is sucked onto the vacuum conveyor 13 by virtue of a negative pressure and is conveyed forward together with the vacuum conveyor 13. A front portion of the vacuum conveyor 13 intersects the conveying passage (i.e., the uprightly conveying passage) of the endless belts 17 in the uprightly conveying means 12. The end portion of the PTP 1 having thus been conveyed by the vacuum conveyor 13 is inserted between two longitudinally adjacent pairs of pinching pieces 19 attached to the endless belts 17 of the uprightly conveying means 12. Thus, the right and left portions of the PTP 1 are pinched by the pairs of pinching pieces 19. The pinching pieces 19 pinching the PTP 1 therebetween rise gradually with rotation of the endless belts 17 and become substantially upright after passing the rear pulleys 18b. Thereafter, the pinching pieces 19 retain this upright state until reaching the front pulleys 18a. In this way, the right and left portions of the PTPs 1 are held between longitudinally adjacent pairs of pinching pieces 19 in an upright position, and the PTP 1 is conveyed forward by the uprightly conveying means 12.

An inverting apparatus 20, which is disclosed in U.S. patent application Ser. No. 09/237,144, is mounted on a frame above the uprightly conveying means 12. The inverting apparatus 20 can reciprocate above and in parallel with the uprightly conveying passage, and can move vertically toward and away from the same passage. The inverting apparatus 20 provides means for pinching selected PTPs 1, rising from the uprightly conveying passage, inverting the selected PTPs so that the blistered surfaces of the selected PTPS oppose those of the remaining PTPs, and moving down and putting the PTPs back onto the uprightly conveying passage at a predetermined position.

To be more specific, the inverting apparatus 20 comprises a base 21, rotary units 22 supported on the base 21, an advancing/retreating means 23 which utilizes a ball screw to reciprocate the base 21 in parallel with the uprightly conveying passage, a lift means 24 which utilizes a ball screw to move the base 21 vertically with respect to the uprightly conveying passage, a rotating means 25 for rotating the rotary units 22 at an angle of 180°, and a plurality of pinching units 26 attached to the rotary units 22. While the base 21 is moved forward by the advancing/retreating means 23 in synchronism with the PTPs 1 in the uprightly conveying passage, the pinching units 26 go down into this conveying passage by operation of the lift means 24, pinch the selected PTPs 1, and rise them from the conveying passage. Subsequently, the rotary units are turned 180° by the rotating means 25. Finally, the pinching units 26 are moved down again toward the uprightly conveying passage by operation of the lift means 24 to unpinch the PTPs 1, and then rise from the conveying passage.

The bunching and transferring apparatus 30 embodying the present invention is disposed in front of the inverting apparatus 20. It can reciprocate vertically, longitudinally and transversely with respect to the uprightly conveying means 12. Further, the bunching and transferring apparatus 30 is provided with an intermittently conveying means 50 constituted by a bucket conveyor which travels in parallel with the uprightly conveying means 12.

In the bunching and transferring apparatus 30, firstly, a pair of PTPs, consisting of a PTP inverted by the inverting apparatus 20 and an uninverted PTP, is pinched, moved upward and separated from the uprightly conveying passage. Next, a predetermined number of such PTP pairs are bunched together as one group, and the thus-bunched PTPs are moved traversely above the uprightly conveying means 12 onto the intermittently conveying means 50. Then the PTPs bunched into one group are moved down and put into a bucket of the intermittently conveying means 50. Finally, the group of PTPs inserted into the bucket is further carried to a binding apparatus by operation of the intermittently conveying means 50. The pinching and raising motions of the bunching and transferring apparatus 30 are carried out while the apparatus 30 moves forward in synchronism with the conveying operation of the uprightly conveying means 12.

Figure 4:
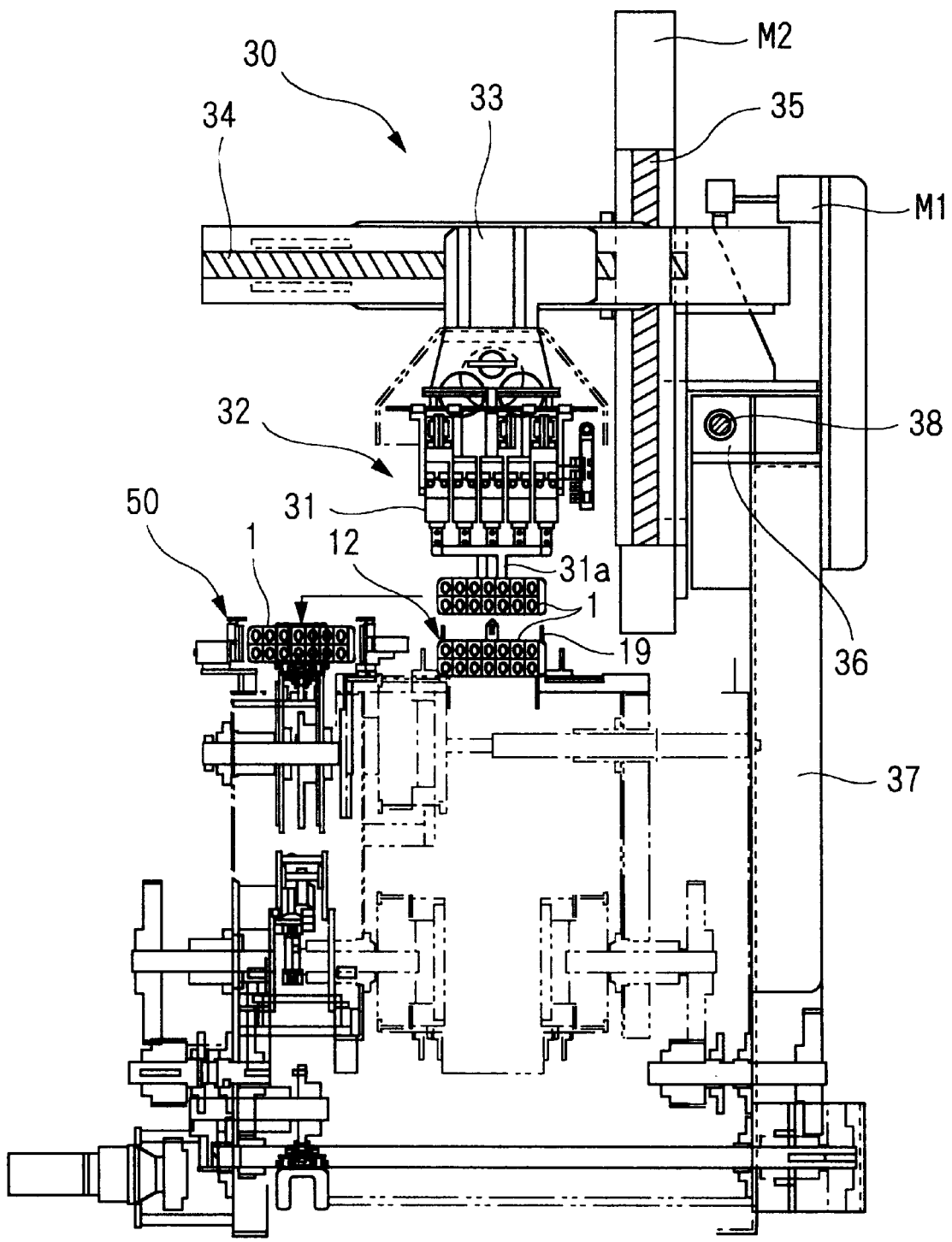
FIG. 4 is a partially sectional side view showing a portion of the apparatus of FIG. 3.

As shown in FIGS. 3 and 4, the bunching and transferring apparatus 30 comprises, as a basic constituent, a pinching device 32 having a plurality of pinching units 31 which pinch an inverted PTP and uninverted PTP in a pair. A suspending block 33 is disposed above the pinching device 32, and an upper portion of the suspending block 33 is screwed to a first ball screw 34 which extends in the transverse direction across the uprightly conveying means 12. The first ball screw is rotated forwardly and reversely by a first servo-motor M1, whereby the suspending block 33 of the pinching device 32 can be reciprocated in the transverse direction. A frame which rotatably supports the first ball screw 34 is screwed with a second ball screw 35 which is disposed vertically. The second ball screw 35 is rotated forwardly and reversely by a second servo-motor M2, whereby the pinching device 32 can be moved vertically, together with the first ball screw 34. A block 36 is fixed to a frame of the second ball screw 35 and it is rotatably screwed with a third ball screw 38 which extends in parallel with the conveying passage of the uprightly conveying means 12. As shown in FIG. 3, the third ball screw 38 is rotated forwardly and reversely by a third servo-motor M3, whereby the pinching device 32 can be reciprocated along the conveying passage of the uprightly conveying means 12.

Figure 5A:
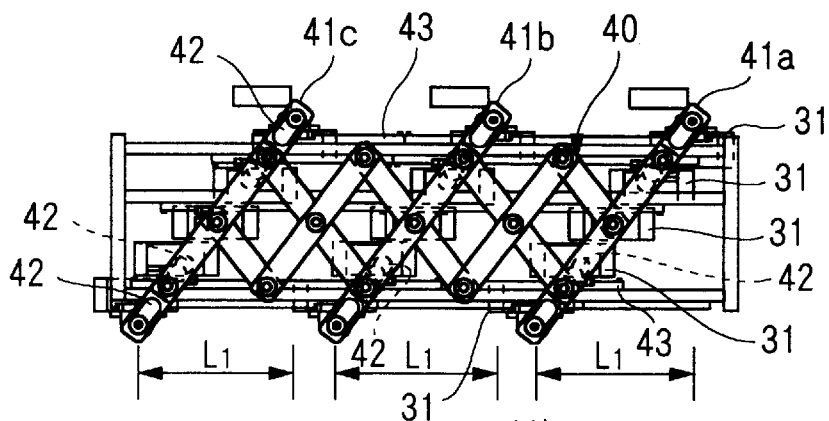
FIG. 5a is a plan view in an expanded state.

As shown in FIG. 5a, the pinching device 32 is provided with an expanding/contracting means constituted by an expanding/contracting arm 40 assembled in a pantograph-like form. Right and left arm pieces 41a, 41c and a central arm piece 41b are disposed in the expanding/contracting arm 40 in parallel with one another. A total of four elongated holes 42 (two on both sides of a central pivot portion of the arm pieces 41) are pierced in each of the arm pieces 41a, 41b and 41c. Five pinching units 31 are disposed below each of the arm pieces 41a, 41b and 41c at equal intervals, which are indicated as rectangles in FIGS. 5a and 5b. The upper ends of four pinching units 31 out of the five pinching units (i.e., the four units except the central one) are loosely fitted in the aforesaid elongated holes through levers. The central pinching unit is connected to the central pivot portion of the arm piece. Guide frames 43, which are loosely fitted in the upper end portions of the pinching units 31, are disposed below the expanding/contracting arm 40. When the expanding/contracting arm 40 is contracted, the guide frames 43 guide the pinching units 31 so that the pinching units 31 move linearly in the longitudinal direction of the foregoing conveying passage. At this time, the elongated holes 42 formed in the arm pieces permit the pinching units 31 to move linearly along the conveying passage.

Figure 5B:
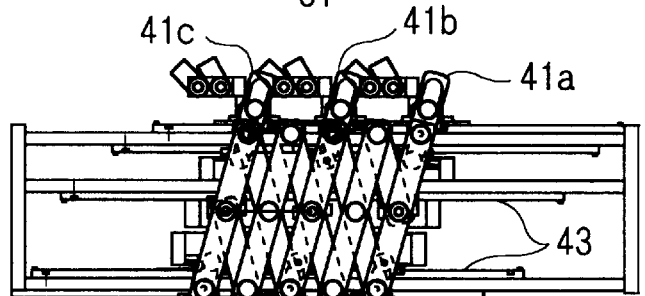
FIG. 5b is a plan view in a contracted state.
Figure 5C:
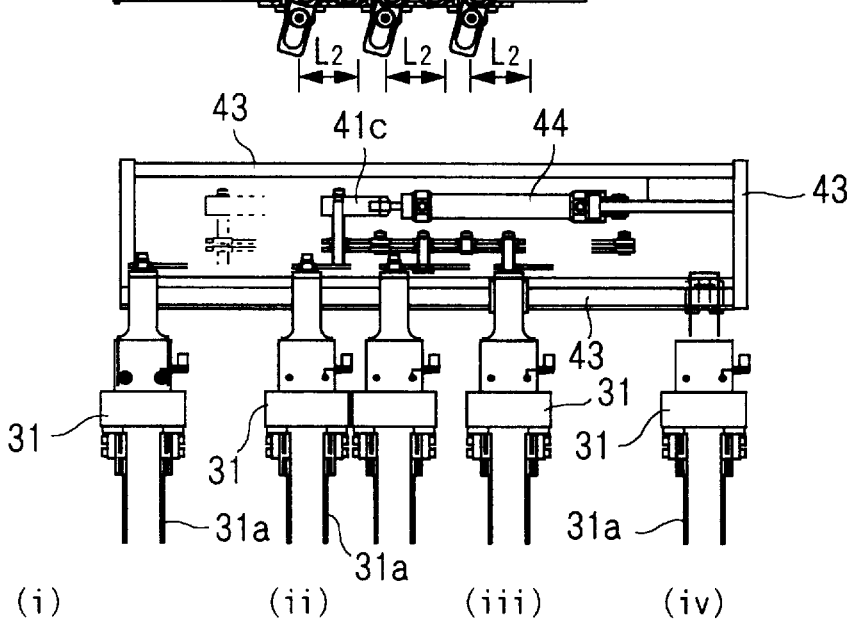
FIG. 5c is a front view in the expanded state.

To allow the expanding and contracting motions of the expanding/contracting arm 40, the cylinder-side of an air cylinder 44 is fixed to the guide frame 43 and the piston rod-side thereof is connected to the central pivot portion of the left-hand arm piece 41c, as shown in FIG. 5c.

In the state shown in FIG. 5a, the expanding/contracting arm 40 is in its expanded state, and pinching fingers 31a of each pinching unit 31 are opened. The pair of fingers 31a have a space opened therebetween which permits one pair of PTPs to be pinched from both front and rear sides, the paired PTPs being located on the conveying passage of the uprightly conveying means 12 and consisting of an inverted PTP and an uninverted PTP.

Figure 5D:
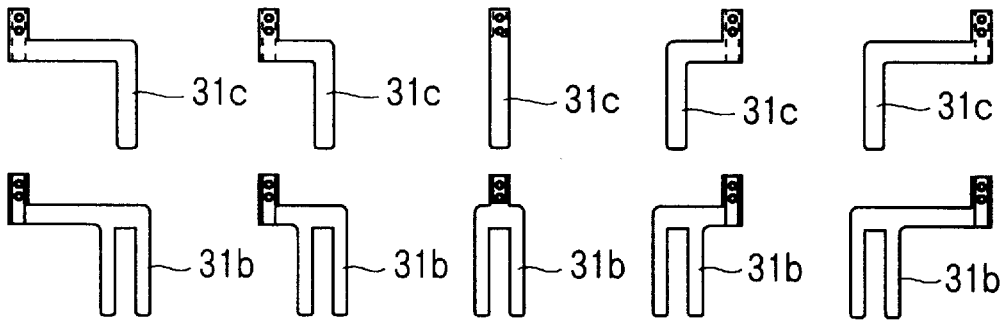
FIG. 5d is a side view showing shapes of pinching fingers used for the pinching units.

As shown in FIG. 5d, the pair of pinching fingers 31a attached to each pinching unit 31 is comprised of a bifurcated finger piece 31b and a finger piece 31c which is shaped so that its single finger portion comes between the bifurcated finger piece 31b. The pinching fingers (i), (ii), (iv) and (v) of the pinching units located on both sides of the central pinching fingers (iii) of each arm piece 41 are bent to have an L-shape. The pairs of fingers 31a located on the right side of the central fingers are bent in the opposite direction of the fingers located on the left side. Also, the pinching fingers (i) and (v) of the pinching units located on both ends of the arm piece are more largely bent than the pinching fingers (ii) and (iv) of the pinching units located closer to the central side. Thus, the pinching finger pairs are formed so that all the pinching finger pairs can pinch the central portion of the paired PTPs 1 from both front and rear sides.

FIG. 5a shows a state in which the pinching units 31 can pinch PTPs being conveyed in the uprightly conveying passage, and the spacing between the foremost pinching unit and the rearmost pinching unit of the five pinching units 31 is indicated by L1. FIG. 5b shows a state in which the pinching fingers 31a of each pinching unit 31 are closed and the expanding/contracting arm 40 has been contracted by operation of the air cylinder 44. In this state, the spacing L2 between the foremost and the rearmost pinching unit of the five pinching units 31 is narrower, i.e., about one third of the aforesaid spacing L1. Therefore, when the expanding/contracting arm 40 is contracted by operation of the air cylinder 44 after each pinching unit 31 has pinched a pair of PTPs, the spacing of five pairs of PTPs pinched by the five pinching units 31 is reduced from L1 to L2 which is about one third of L1. The timing to open and close the pinching fingers 31a of each pinching unit 31 can be easily controlled with air pressure, preferably by using a pneumatic chuck unit as the pinching unit.

The following description is of the intermittently conveying means 50 which is provided in the bunching and transferring apparatus 30 and which is constituted by a bucket conveyor disposed in parallel with the uprightly conveying means 12.

Figure 6:
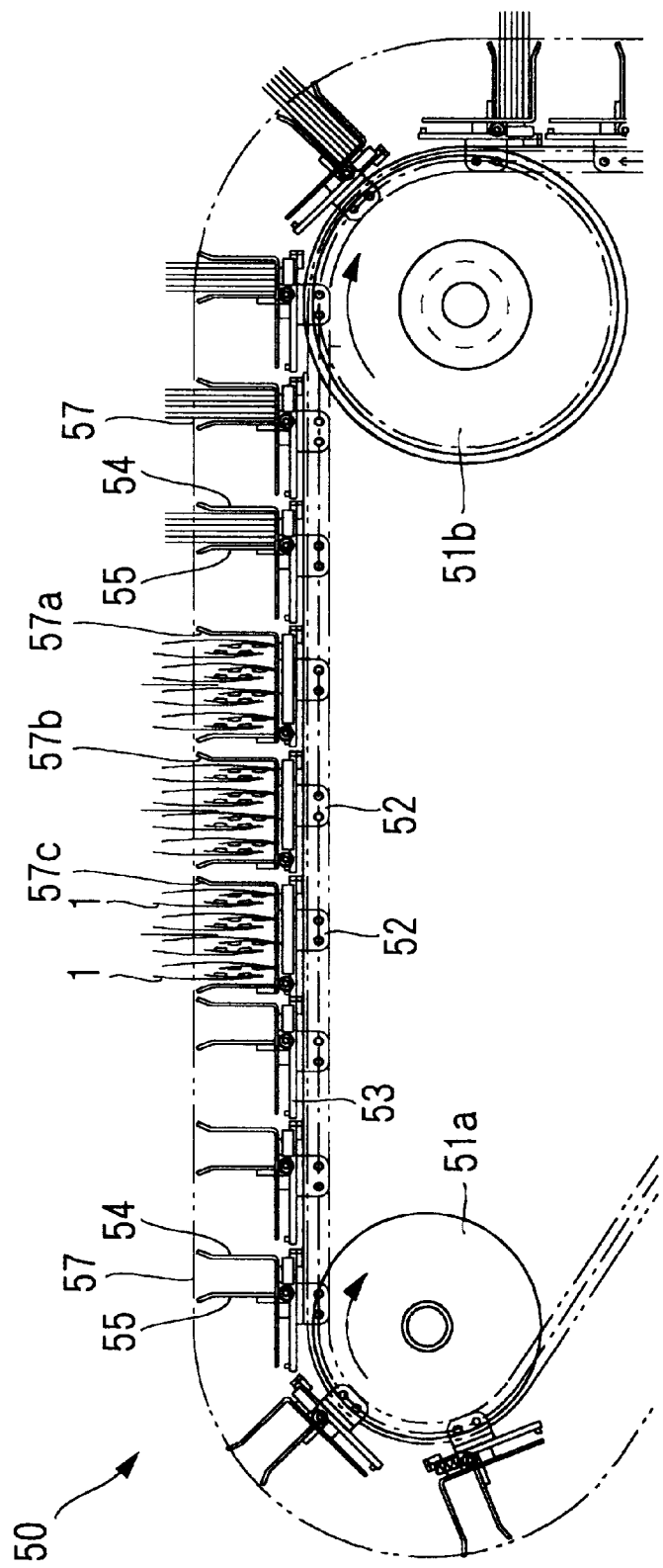
FIG. 6 is an enlarged front view showing an upper portion of a bucket conveyor of the present invention.

As shown in FIGS. 3 and 6, the intermittently conveying means 50 comprises sprockets 51a, 51b and 51c disposed at front, rear and front lower positions respectively, an endless chain 52 wound on the sprockets 51a, 51b and 51c and driven intermittently, pedestal plates 53 attached to the endless chain 52 at predetermined intervals, and an openable/closable bucket 57 comprised of an L-shaped fixed-bucket piece 54, an L-shaped movable-bucket piece 55 and tension springs 56. The fixed-bucket piece 54 and the movable-bucket piece 55 are arranged onto the endless chain 52 through the pedestal plates 53, and both pieces 54 and 55 are connected together through the tension springs 56 (see FIG. 7). In this way there is formed a bucket 57 wherein the movable bucket piece 55 is movable toward and away from the fixed bucket piece 54. That is, the bucket 57 can be opened and closed.

Figure 7:
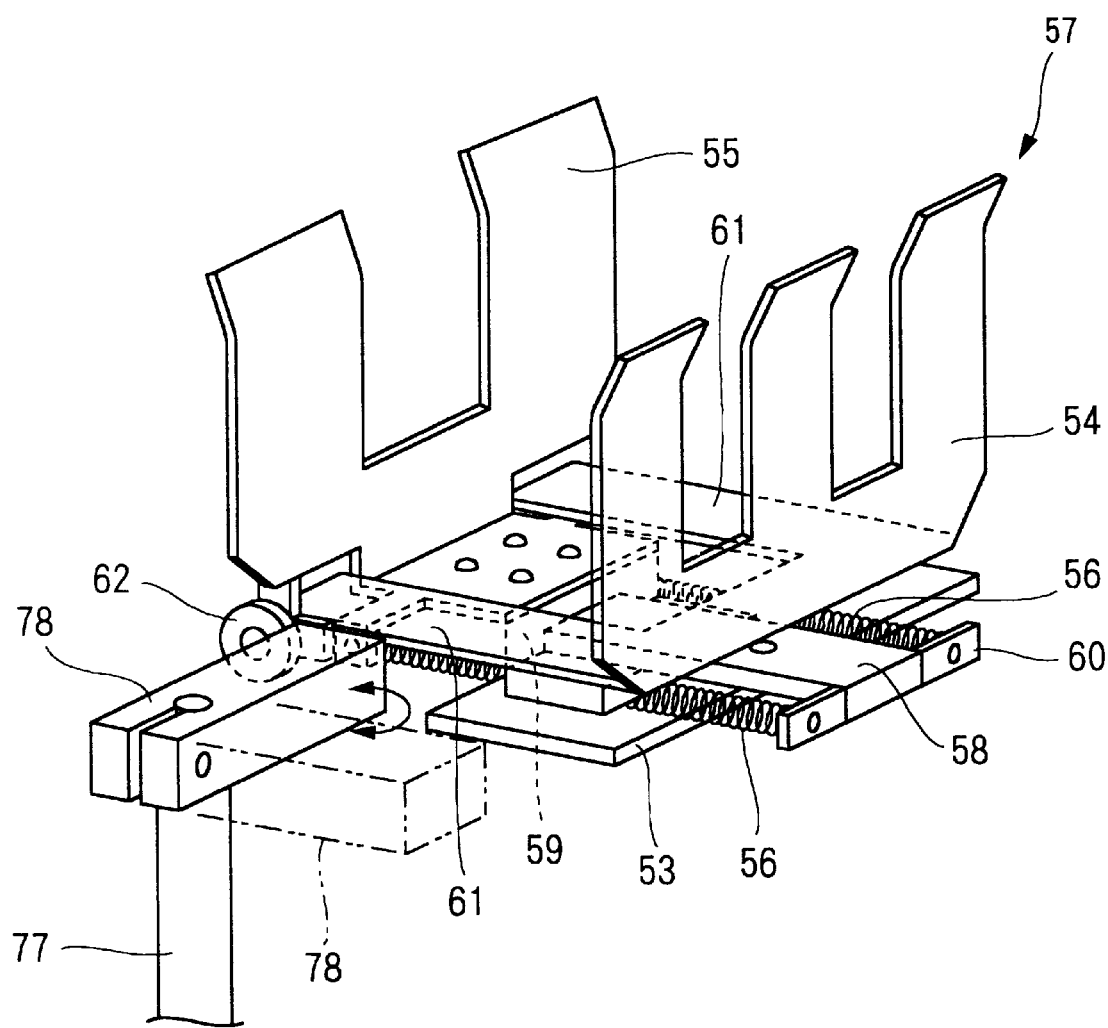
FIG. 7 is a perspective view showing a bucket mounted on the bucket conveyor of the present invention.

More specifically, as shown in FIG. 7, the bottom of the fixed-bucket piece 54 is fixed above the pedestal plate 53 with a predetermined gap provided therebetween with use of a pair of screws (not shown). In the gap between the pedestal plate 53 and the bottom of the fixed-bucket piece 54 is disposed a guide rail 58, which is fixedly mounted onto the upper surface of the pedestal plate 53. Further, an inverted U-shaped slide piece 59 is attached to the bottom of the movable-bucket piece 55 so as to cover the guide rail 58, and the slide piece 59 is slidably mounted onto the guide rail 58. The tension springs 56 are disposed on both sides of the slide piece 59. One end of the tension springs 56 is anchored to the bottom of the movable bucket piece 55, while the opposite ends thereof are fixed to flanges 60 formed at the end portion of the guide rail 58 on the side opposite to the movable bucket piece 55. Horizontal arm portions 61 extend from both sides of the fixed bucket piece 54 and loosely fit into the cutout portions formed on both sides of the vertical wall portion of the movable bucket piece 55. According to this construction, the movable bucket piece 55 is usually biased toward the fixed bucket piece 54 by means of the tension springs 56. Rollers 62 as a lug are mounted on both sides of bottom corner portions of the movable bucket piece 55 so as to project outwardly from both side faces of the fixed bucket piece 54.

As shown in FIG. 6, each bucket 57 of the intermittently conveying means 50 is in its closed position, i.e. the movable bucket piece 55 is close to the fixed bucket piece 54 when passing the rear sprocket 51a. On the other hand, when the buckets reach a predetermined position between the front and rear sprockets 51b, 51a, three of the buckets 57a, 57b and 57c are opened in that the movable bucket piece 55 is spaced away from the fixed bucket piece 54. Then the PTPs which have been bunched as above are inserted into each of these opened buckets.

Now, with reference to FIGS. 8a and 8b, a description will be given below of a mechanism for setting the three buckets 57a–57c into their opened state.

Figure 8A:
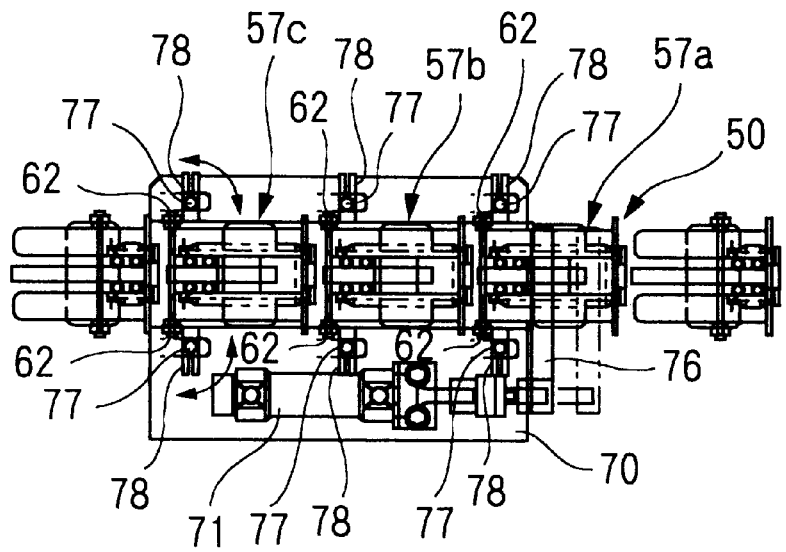
FIG. 8a is a partially sectional plan view thereof and FIG. 8b is a sectional side view thereof.
Figure 8B:
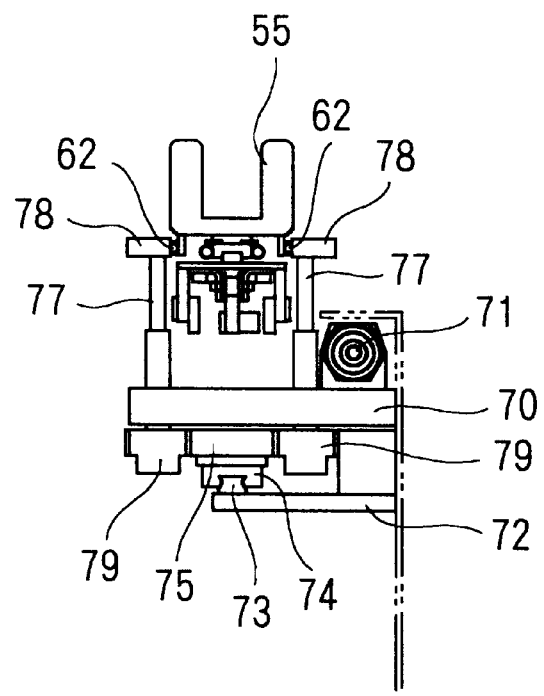
Figure 10:
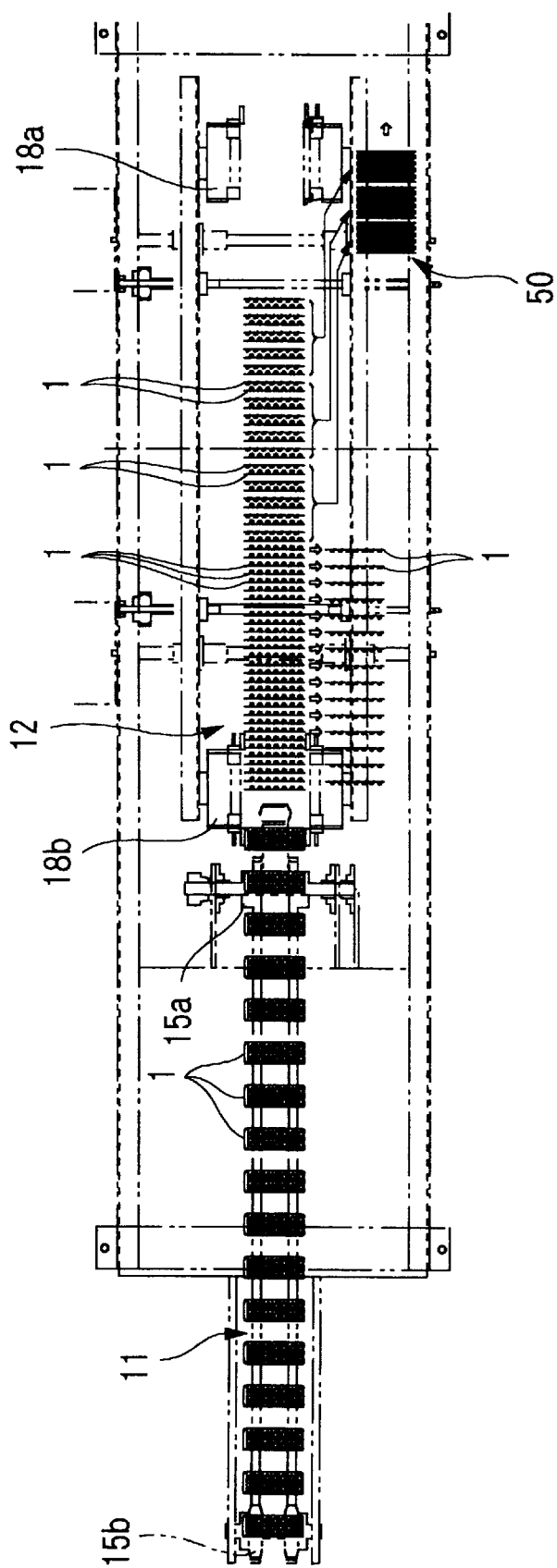
FIG. 10 is a plan view showing motions of PTPs in the bunching and transferring apparatus of the present invention.

As shown in FIGS. 8a and 8b, a support base 70 is secured to a frame at a predetermined position between the front and rear sprockets 51b, 51a and below the intermittently conveying means 50. Further, an air cylinder 71 is installed on the support base 70. As shown in FIG. 8b, a support plate 72 is attached to the underside of the support base 70 through a block piece, and a slide guide 73 is mounted on the upper surface of the support plate 72. A rack 75 is supported on the upper portion of the slide guide 73 through an inverted U-shaped slider 74 which fits slidably onto the upper portion of the slide guide 73. A connecting plate 76 is attached perpendicularly to the front end of the piston rod of the air cylinder 71 (see FIG. 8(a)), and a front end portion of the rack 75 is connected to the connecting plate 76. The protruding and retracting motions of the air cylinder 71 causes the rack 75 to move back and forth on the slide guide 73 along the conveying passage of the intermittently conveying means 50.

Three pairs of, that is, a total of six rotatable shafts 77 are provided on the support base 70 at intervals corresponding to the length of the bucket 57 in the longitudinal direction and in sandwiching relation to the conveying passage. The upper end of each rotatable shaft 77 projects above the conveying passage and a kick lever 78, which is generally rectangular in plan, is fixed thereto. The lower end of each rotatable shaft 77 projects downward from the support base 70 and a pinion 79 is fixed thereto, which pinion is engaged with the rack 75.

According to the above construction, when the air cylinder 71 is actuated to have its piston rod protruded, the rack 75 attached thereto through the connecting plate 76 is moved a predetermined amount, and thus the pinion 79 engaged with the rack 75 turns about 90°. Accordingly, the kick lever 78 fixed to the upper end of the rotatable shaft also turns about 90°, so that the longitudinal axis of the kick lever 78 becomes perpendicular to the conveying passage of the intermittently conveying means 50, and hence, the free end of the kick lever 78 projects into the conveying passage. Conversely, upon retraction of the piston rod of the air cylinder 71, the rack 75 moves in the direction opposite to the above direction. Thus, the pinion 79 engaged with the rack 75 also moves in the opposite direction, so that the longitudinal axis of the kick lever 78 becomes parallel to the conveying passage and hence the kick lever 78 moves away from the conveying passage.

The longitudinal axis of each kick lever 78 is normally in parallel with the conveying passage of the intermittently conveying means 50, causing no obstacle against the movement of the bucket 57. However, as noted above, when the air cylinder 71 is actuated and the free end of each kick lever 78 projects perpendicularly into the conveying passage, the kick levers 78 come into abutment against the rollers 62 provided at both bottom corners of the movable bucket piece 55 of the bucket 57 which is subsequently moved intermittently. This prevents the movable bucket piece 55 from moving forward together with the fixed bucket piece 54 and causes the movable bucket piece 55 to be pulled apart from the fixed bucket piece 54 against the tension springs 56. Therefore, the bucket 57 can be opened and be ready for a predetermined number of PTPs to be loaded thereinto by means of the bunching and transferring apparatus 30.

In this embodiment of the present invention, three bundles of PTPs are simultaneously loaded from above into the three buckets 57a–57c, so it is necessary that the three buckets be opened at their stand-by positions for loading. For setting the three buckets at their opened positions, the air cylinder 71 is actuated just after the bucket conveyor has moved twice intermittently, causing the associated three pairs of kick levers 78 to project perpendicularly to the conveying passage. As a result, at the time of the third intermittent movement which follows the above intermittent movement of the bucket conveyor, the rollers 62 of each movable bucket piece 55 come into abutment against the kick levers 78, so that the movable bucket piece 55 moves backward and assumes its opened position apart from the fixed bucket piece 54. After the three bundles of PTPs have been loaded respectively into the three buckets 57a–57c and just before the bucket conveyor is again moved intermittently, the air cylinder 71 is again actuated, causing the kick levers 78 to turn to their parallel position with the conveying passage. Thus, the kick levers 78 do not obstruct the movement of the buckets at the time of the fourth intermittent movement of the bucket conveyor. Then, after two buckets have advanced intermittently to the above stand-by positions, the air cylinder 71 is again actuated to project the kick levers 78 perpendicularly to the conveying passage.

Further, in the apparatus according to one aspect of this invention, a PTP dislodgment-preventing device 80 is disposed between the front and rear sprockets 51b, 51a of the intermittently conveying device 50 and on both sides of the three buckets 57a–57c to be opened as noted above. The dislodgment-preventing device 80 is constructed as in FIGS. 9(a) and 9(b). As shown in both figures, one air cylinder 81a is secured to a frame provided on one side of the conveying passage, and a connecting plate 82a is attached to a piston rod of the air cylinder 81a. An elongated, rectangular plastic piece 83 having a length corresponding to the total length of the three buckets 57 is attached to the upper end of the connecting plate 82a horizontally so as to project inwardly from the connecting plate 82a. On a frame provided on another side of the conveying passage, three air cylinders 81b are secured to the frame at the same intervals as the intervals of the buckets 57a–57c. A connecting plate 82b is attached to a piston rod of each air cylinder 81b, and a plastic piece 84 having a length equal to the length of one bucket 57 is attached to the upper end of the connecting plate 82b horizontally so as to project inwardly therefrom.

The piston rods of the air cylinders 81a and 81b are normally retracted and, in this state, PTPs are pinched and loaded into the opened buckets 57a–57c by the pinching fingers 31a of the bunching and transferring apparatus 30. Just thereafter, the air cylinders 81a and 81b located on both sides of conveying passage are actuated and their piston rods protrude, whereby the horizontal plastic pieces 83 and 84 cover the upper ends of the PTPs 1 from above like eaves. Consequently, when the pinching fingers 31a of the bunching and transferring apparatus 30 release the PTPs 1 and rise, the PTPs are prevented from rising together with the pinching fingers 31a and falling off from the bucket 57. Thereafter, the piston rods of the air cylinders 81a and 81b are retracted so that the plastic pieces 83 and 84 do not obstruct the operation of the intermittently conveying means 50, as shown in FIG. 9.

In the embodiment being considered, as shown in FIG. 3, a pusher 90 of a known structure is disposed at a position between the front sprocket 51b and the sprocket 51c located below the front sprocket. Five pairs of, i.e., ten PTPs 1 being conveyed intermittently in each bucket 57 are pushed horizontally at both end portions thereof protruding from the bucket 57 and are thereby discharged to a binding apparatus 91 disposed behind the pusher 90.

Components of the apparatus embodying the invention have been outlined above with respect to their structures and operations. The operation of the whole of the bunching and transferring apparatus embodying the invention will now be described, with reference to FIGS. 3 and 10.

As shown in both figures, while PTPs 1 are conveyed continuously forward by both the horizontally conveying means 11 and uprightly conveying means 12 in the conveying apparatus 10, the PTPs are inverted in an alternate manner by the inverting apparatus 20. The inverted PTPs and uninverted PTPs thus arranged in an alternate manner are conveyed to the front of the uprightly conveying means 12. In the conveying passage of the uprightly conveying means 12 shown in FIG. 10, the PTPs indicated with white arrows represent PTPs which are inverted by the inverting apparatus 20.

In the illustrated bunching and transferring apparatus 30, the pinching device 32 has fifteen pinching units 31 and is moved forward at a speed equal to the conveying speed of the uprightly conveying means 12 by means of the third servo-motor M3. At the beginning of this forward movement, the pinching fingers 31a of respective pinching units 31 are in an opened state, and when the pinching device 32 is brought down by the second servo-motor M2, the pinching fingers 31a move down to a position to pinch a pair of inverted and uninverted PTPs from both front and rear sides. When the pinching fingers 31a are closed, which closing is effected with air in the case of a pneumatic chuck unit, the pinching fingers 31a pinch the paired PTPs. upon completion of this pinching motion, the pinching device 32 is raised above the uprightly conveying means 12 by inverse rotation of the second servo-motor M2.

Subsequently, the air cylinder 44 located inside the guide frames 43 extending above the pinching units 31 is actuated and its piston rod is retracted. Thus, the expanding/ contracting arm 40 assembled in a pantograph form is contracted, so that the spacing between the five pairs of PTPs held by each arm piece 41 is narrowed in the conveying passage direction, and the spacing between adjacent arm pieces 41a–41c is also narrowed. As a result, the spacing of fifteen pairs of, i.e., 30 PTPs is narrowed to about one third, and thus, the PTPs are bunched.

Almost simultaneously with this bunching operation, the first servo-motor M1 is actuated, and the pinching device 32 is moved from above the uprightly conveying means 12 across to the intermittently conveying means 50. At this time, in the intermittently conveying means 50 which is conveyed intermittently, three buckets 57a–57c are waiting at the position just under the pinching device 32 and each of the buckets is opened widely with the movable bucket piece 55 being spaced apart from the fixed bucket piece 54. In this state, the second servo-motor M2 of the pinching device 32 is actuated and the pinching units 31 move down, so that the PTPs bunched together as three 5-pair PTPs and pinched by the arm pieces 41a–41c of the pantograph-shaped expanding/contracting arm 40 are loaded as three bundles into the buckets 57a–57c, respectively, which buckets are positioned just thereunder.

Immediately thereafter, the air cylinders 81a and 81b of the dislodgment-preventing device 80 are actuated to move the plastic pieces 83 and 84 inward toward the conveying passage. The plastic pieces 83 and 84 cover both corner portions of the upper end of the PTP bundles loaded into each of the buckets 57a–57c. Then, the air which has been fed under pressure to the pinching units 31, pneumatic chuck units in this embodiment, is released to deactivate the same. Just thereafter, the second servo-motor M2 is actuated to raise the pinching device 32. At this time, since both sides of the upper end corner portions of each PTP bundle are covered with the plastic pieces 83 and 84 of the dislodgment-preventing device 80, the PTPs are prevented from being carried by the pinching fingers 31a and falling off from the buckets 57a–57c.

Thereafter, the air cylinders 81a and 81b of the dislodgment-preventing device 80 are again actuated, causing the plastic pieces 83 and 84 to move back from the conveying passage. At the same time, the air cylinder 71 located below the buckets 57a–57c is actuated, and the kick levers 78 become parallel to the conveying passage and hence release the rollers 62. As a result, the movable bucket piece 55 of each bucket 57 approaches the fixed bucket piece 54 under the action of the tension springs 56. By this operation, five pairs of PTPs which have been loaded to the bucket 57 are pinched. Thereafter, the buckets 57 are moved forward by the intermittently conveying means 50.

On the other hand, upon turning "ON" of the first servo-motor M1, the pinching device 32 which has risen above the intermittently conveying passage passes thereacross and arrives at a position above the uprightly conveying passage. Then, upon actuation of the third servo-motor M3, the pinching device 32 returns to its initial position behind the uprightly conveying passage, namely, the front-end position of the inverting device 20. While this operation proceeds, the expanding/contracting arm 40 assembled in a pantograph form is returned to its opened position shown in FIG. 5a by extension of the piston rod of the air cylinder 44. In this state, pinching units 31 adjacent to each other longitudinally are spaced apart to a distance equal to the spacing between a pair of inverted and uninverted PTPs. During this return to the initial position, a control is made so that the pinching fingers 31a of each pneumatic chuck unit as the pinching unit 31 assume respective positions at which the spacing therebetween is the widest.

At the above initial position, the pinching device 32 again moves down to the uprightly conveying passage 12 and the same PTP bunching and transferring operations as above are repeated.

The above embodiment is a preferred embodiment of the present invention and various modifications and changes may be made.

For example, in the above embodiment, PTPs are pinched and bunched while being conveyed along the uprightly conveying passage which extends horizontally, and the thus-bunched PTPs are loaded into buckets which are moving horizontally in the intermittently conveying passage. However, the above pinching, bunching and loading operations may be made while PTPs are conveyed along an inclined or vertical conveying passage by an uprightly conveying means. In this case, however, the intermittently conveying passage should be parallel to the inclined or vertical conveying passage. Also, a pinching device 32 having a plurality of pinching units 31 should be capable of reciprocating along this uprightly conveying passage and also capable of reciprocating and moving toward and away from the uprightly conveying passage in directions orthogonal to the same passage.

Also, in the above-described embodiment, the uprightly conveying means is driven continuously, but it may be driven intermittently.

Further, in the above embodiment, a PTP whose blistered surface has been inverted by the inverting apparatus and a PTP which has not been inverted are arranged in an alternate manner and are pinched in a pair by a pinching unit of the pinching device. Instead, an improvement can be made on the pinching fingers of each pinching unit so that three PTPs arranged in a desired arrangement by the inverting apparatus are pinched and bunched by a single pinching unit.

Moreover, in the above embodiment, PTP bundles are loaded simultaneously into three buckets 57a–57c on the bucket conveyor, but the number of buckets is not limited to three, but may be any desired number, including unity.

What is claimed is:

1. A method of bunching and transferring press-through packs (PTPS) comprising the steps of:

conveying a multitude of PTPS, a portion of which are inverted with respect to the conveying direction and the rest of which are not inverted, along a first conveying passage while maintaining blistered surfaces of the inverted and uninverted PTPS in parallel with each other;

pinching a selected portion of PTPs being conveyed in said first conveying passage and separating the same from said passage;

bunching the separated PTPs together while narrowing the spacing between the separated PTPs in the conveying direction;

transferring the bunched PTPs onto a second conveying passage across said first conveying passage; and loading said bunched PTPs into a bucket provided on a bucket conveyor which travels along said second conveying passage.

2. A method according to claim 1, wherein a conveying means associated with said first conveying passage is driven continuously, while said bucket conveyor associated with said second conveying passage is driven intermittently.

3. A method according to claim 1, wherein the inverted PTPs and uninverted PTPs of said multitude of PTPs are arranged in an alternate manner, and plural pairs of PTPs are pinched and separated from said first conveying passage, each pair of PTPS consisting of an inverted PTP and an uninverted PTP.

4. A method according to claim 1, wherein said pinched and separated PTPs are bunched into a plurality of groups in their conveying direction and the thus-bunched PTP groups are respectively loaded into separate buckets.

5. An apparatus for bunching and transferring PTPs comprising:

a first conveying means for conveying a multitude of PTPS, a portion of which are inverted with respect to the conveying direction and the rest of which are not inverted, along a first conveying passage while maintaining the blistered surfaces of the inverted and uninverted PTPs in parallel with each other;

a pinching means having a multitude of pinching units;

a first drive means for reciprocating said pinching means in the longitudinal direction of said first conveying passage;

a second drive means for reciprocating said pinching means in the vertical direction of said first conveying passage;

a third drive means for reciprocating said pinching means in a direction transverse to said first conveying passage;

an opening/closing means for opening and closing pinching fingers of said pinching units at predetermined timings;

an expanding/contracting means which expands and contracts the spacings between said pinching units of said pinching means in the longitudinal direction; and a second conveying means constituted by a bucket conveyor adapted to travel along a second conveying passage which is parallel to said first conveying passage, wherein said first, second and third drive means, said opening/closing means and said expanding/contracting means are controlled so as to carry out the method claimed in claim 1.

6. An apparatus according to claim 5, wherein said multitude of pinching units are attached to an expanding/contracting arm for expanding and contracting in a pantograph form, and when said expanding/contracting arm is in an expanded state, said pinching units are in a position above said first conveying passage so that each said pinching unit can pinch a pair of PTPs adjacent to each other longitudinally in said first conveying passage, and when said expanding/contracting arm is contracted, the spacing between said pinching units is narrowed to less than half the length of the spacing in the expanded state.

7. An apparatus according to claim 5, wherein said bucket conveyor is driven intermittently, the buckets of said bucket conveyor are each composed of a fixed bucket piece and a movable bucket piece for moving close to and away from said fixed bucket piece through a tension spring, said movable bucket piece being provided with a lug, and said second conveying passage is provided with protruding pieces, each protruding piece being adapted to protrude into said second conveying passage at predetermined timings and come into engagement with said lug of the movable bucket piece to move said movable bucket piece away from said fixed bucket piece upon conveying of each bucket.

8. An apparatus according to claim 5, wherein means for preventing dislodgment of said bunched-PTPs are disposed on both sides of said second conveying passage, said dislodgment-preventing means covering both side portions of the upper end of said bunched PTPs when loaded into each bucket.

* * * * *